US008888383B2

(12) United States Patent
McColloch

(10) Patent No.: US 8,888,383 B2
(45) Date of Patent: Nov. 18, 2014

(54) ACTIVE OPTICAL CABLE (AOC) CONNECTOR HAVING A MOLDED PLASTIC LEADFRAME, AN AOC THAT INCORPORATES THE AOC CONNECTOR, AND A METHOD OF USING AN AOC

(75) Inventor: Laurence R. McColloch, Santa Clara, CA (US)

(73) Assignee: Avego Technologies General IP (Singapore) Pte. Ltd., Singapore (SG)

( * ) Notice: Subject to any disclaimer, the term of this patent is extended or adjusted under 35 U.S.C. 154(b) by 255 days.

(21) Appl. No.: 13/100,044

(22) Filed: May 3, 2011

(65) Prior Publication Data

US 2012/0281952 A1 Nov. 8, 2012

(51) Int. Cl.
*G02B 6/42* (2006.01)
*G02B 6/36* (2006.01)

(52) U.S. Cl.
USPC ................................. 385/93; 385/92

(58) Field of Classification Search
USPC ................................. 385/88, 92, 93
See application file for complete search history.

(56) References Cited

U.S. PATENT DOCUMENTS

| | | | |
|---|---|---|---|
| 4,902,092 A | 2/1990 | Grandy | |
| 5,361,318 A * | 11/1994 | Go et al. | 385/89 |
| 5,647,042 A * | 7/1997 | Ochiai et al. | 385/56 |
| 5,708,743 A * | 1/1998 | DeAndrea et al. | 385/88 |
| 6,164,838 A * | 12/2000 | Maehara et al. | 385/92 |
| 6,282,352 B1 * | 8/2001 | Kato et al. | 385/92 |
| 6,497,518 B1 | 12/2002 | Deane | |
| 6,543,941 B1 | 4/2003 | Lampert | |
| 7,136,594 B2 * | 11/2006 | Nakanishi et al. | 398/164 |
| 7,331,819 B2 | 2/2008 | Nelson et al. | |
| 7,473,107 B2 | 1/2009 | Ice | |
| 7,540,747 B2 | 6/2009 | Ice et al. | |
| 7,578,623 B2 * | 8/2009 | Wang et al. | 385/88 |
| 7,665,908 B2 | 2/2010 | Nelson et al. | |
| 7,708,474 B2 | 5/2010 | Wong et al. | |
| 2003/0103336 A1 | 6/2003 | Brezina et al. | |
| 2006/0045434 A1 | 3/2006 | Numata et al. | |
| 2006/0067630 A1 * | 3/2006 | Kim | 385/88 |
| 2006/0239621 A1 | 10/2006 | Lo et al. | |
| 2006/0257082 A1 | 11/2006 | McGarvey et al. | |
| 2008/0044141 A1 * | 2/2008 | Willis et al. | 385/88 |
| 2008/0267564 A1 | 10/2008 | Han et al. | |
| 2010/0129035 A1 * | 5/2010 | Teo | 385/88 |
| 2011/0123151 A1 * | 5/2011 | Zbinden et al. | 385/33 |

FOREIGN PATENT DOCUMENTS

KR 20070059930 A 6/2007

* cited by examiner

*Primary Examiner* — Daniel Petkovsek

(57) ABSTRACT

An AOC connector is provided that has a molded plastic leadframe that obviates the need to use an optical connector in the AOC and that is capable of operating over a wide temperature range and a large number of temperature cycles. The AOC connector includes a plastic optical port that is adapted to be connected via an optically-transparent adhesive material to an end of an optical fiber cable.

22 Claims, 9 Drawing Sheets

US 8,888,383 B2

ACTIVE OPTICAL CABLE (AOC) CONNECTOR HAVING A MOLDED PLASTIC LEADFRAME, AN AOC THAT INCORPORATES THE AOC CONNECTOR, AND A METHOD OF USING AN AOC

TECHNICAL FIELD OF THE INVENTION

The invention relates to active optical cables (ADCs). More particularly, the invention relates to an AOC having an AOC connector comprising a molded plastic leadframe that obviates the need to use an optical connector in the AOC connector.

BACKGROUND OF THE INVENTION

An active optical cable is an optical fiber cable that is terminated on one or both ends with an AOC connector that contains an optical transceiver module. The AOC connector has an AOC connector housing that is typically configured to be received within an opening formed in a receptacle. The AOC connector typically includes an optical connector that is permanently attached to the end of the optical fiber and to the AOC connector housing. Mechanical coupling features on the AOC connector housing form a latch that interlocks with mechanical coupling features on the receptacle to secure the AOC connector to the receptacle. The receptacle may be, for example, an opening formed in a cage. When the AOC connector is fully inserted into the receptacle, the latch of the AOC connector housing engages one or more of the mechanical coupling features of the receptacle to lock the AOC connector housing inside of the receptacle. The latch of the AOC connector housing is typically operable by a user to be placed in a delatching position to enable the user to remove the AOC connector housing from the receptacle.

FIG. 1 illustrates a top perspective view of a known Quad Small Form-Factor Pluggable (QSFP) AOC 2 currently used in the optical communications industry. An optical fiber cable 3 of the QSFP AOC 2 includes a plurality of transmit optical fibers (not shown for purposes of clarity) and a plurality of receive optical fibers (not shown for purposes of clarity). The cable 3 has an optical connector 3a secured to an end thereof, which, in turn, is secured to an AOC connector 4 of the AOC 2. The AOC connector 4 has an AOC connector housing 5. The aforementioned optical transceiver module (not shown for purposes of clarity) is housed within the AOC connector housing 5. The AOC connector housing 5 includes a first housing portion 5a and a second housing portion 5b, which are connected together by fastening elements (not shown for purposes of clarity). The first and second portions 5a and 5b of the housing 5 are typically made of metal, such as cast aluminum, cast zinc, or a cast zinc alloy.

A delatch device 6 of the AOC connector 4 allows the housing 5 to be delatched from a cage (not shown for purposes of clarity) to enable the housing 5 to be removed from the cage. A pull tab 7 is connected on its proximal end 7a to the delatch device 6. When a user pulls on the distal end 7b of the pull tab 7 in the direction indicated by arrow 8, slider portions 6a and 6b of the delatch device 6 move to a limited extent in the direction indicated by arrow 8 (only slider portion 6a can be seen in FIG. 1). This movement of the slider portions 6a and 6b causes outwardly curved ends 6a' and 6b' of the slider portions 6a and 6b, respectively, to press against respective catch features on the cage (not shown for purposes of clarity) to allow the connector housing 5 to be retracted from the cage.

The majority of AOCs currently used in the optical communications industry have configurations that are similar to that of the QSFP AOC 2 shown in FIG. 1, although other types of AOCs having other form factors are also used in the industry. In QSFP AOCs of the type shown in FIG. 1, the optical transceiver module housed in the housing 5 typically includes parallel arrays of electrical-to-optical (EO) conversion elements (e.g., lasers or light-emitting diodes (LEDs)), parallel arrays of optical-to-electrical (OE) conversion elements (e.g., photodiodes), and parallel laser driver and receiver integrated circuit (IC) chips. These parallel components are mounted on an upper surface of a printed circuit board (PCB) 9. The parallel components are relatively expensive due in large part to the fact that a high degree of uniformity is typically required among the EO conversion elements. In addition, the parallel components used in these modules are manufactured in relatively low volumes, and thus generally have higher costs associated with them.

AOCs that have a single EO conversion element and/or a single OE conversion element are also known. In such AOCs, the cable contains at least one optical fiber. Like the QSFP AOC described above with reference to FIG. 1, such AOCs have a AOC connector housing and an optical connector that permanently attaches to the end of the cable and to the AOC connector housing. The AOC connector housing can take on a variety of forms, but typically comprises some type of encapsulation. The EO and/or OE conversion elements, the leadframe, and the metal bond wires that connect the EO and/or OE conversion elements to the leadframe are encapsulated within the encapsulation. The AOC is only capable of operating over a limited range of temperatures due to the fact that the encapsulation, which is typically made of epoxy, has a very different coefficient of thermal expansion (CTE) than metal. Therefore, the epoxy encapsulation expands and contracts at different temperatures than the metal bond wires, which places stress on the metal bond wires. This stress can cause the metal bond wires to break. Consequently, the operations of the AOC may be limited to a relatively small range of temperatures (e.g., 0 to 80 degrees Celsius (C)) and to a relatively small number of temperature cycles (e.g., 200).

One disadvantage of AOCs of the type described above is that they use optical connectors. These optical connectors often have relatively large form factors. For example, the optical connector may be a larger version of the well known LC connector. Such optical connectors are relatively expensive to produce and consume a large amount of space. Therefore, the use of such optical connectors in AOCs tends to increase the overall costs of AOCs.

Accordingly, a need exists for an AOC that does not include an optical connector and therefore has an overall cost that is less than that of known AOCs that are currently available in the market. A need also exists for a relatively low-cost AOC that is capable of operating over a relatively broad range of temperatures and over a relatively large number of temperature cycles.

SUMMARY OF THE INVENTION

The invention is directed to an AOC connector, an AOC cable that incorporates the AOC connector, and a method of using an AOC cable that incorporates the AOC connector. The AOC connector comprises a molded plug body, a leadframe, at least one optoelectronic element, at least one electrical component, and one or more bond wires. The molded plug body has a first molded plug portion and a second molded plug portion that are coupled together. A cavity exists between adjacent inner surfaces of the first and second molded plug portions when the first and second molded plug portions are coupled together. The molded plug portions comprise a plastic material. The molded plug body has at least one optical port and an optics system integrally formed therein. The optical port is adapted to mate with an end of an optical fiber cable. The leadframe is coupled to the molded plug body. The leadframe has a mounting portion that is disposed within the cavity that exists between the first and second molded plug portions. The leadframe has a plurality of leads that have proximal ends that begin at the mounting portion and distal ends that extend away from the molded plug body. The optoelectronic element is mounted on the mounting portion and is electrically connected to at least a first lead of the plurality of leads. The electrical component is mounted on the mounting portion and is electrically coupled to at least second and third leads of the plurality of leads. One or more of the bond wires extend between the optoelectronic element and the electrical component. The bond wires are at least partially disposed within the cavity that exists between the first and second molded plug portions.

The AOC comprises the AOC connector and an optical fiber cable. An end of the optical fiber cable is secured to the optical port of the molded plug body.

The method comprises providing the AOC connector, providing an optical fiber cable having a first end secured to the optical port by an adhesive material that is transparent to an operating wavelength of the AOC, and connecting the leads of the leadframe to an electrical connector.

These and other features and advantages of the invention will become apparent from the following description, drawings and claims.

DETAILED DESCRIPTION OF AN EXEMPLARY EMBODIMENT

Figure 1:
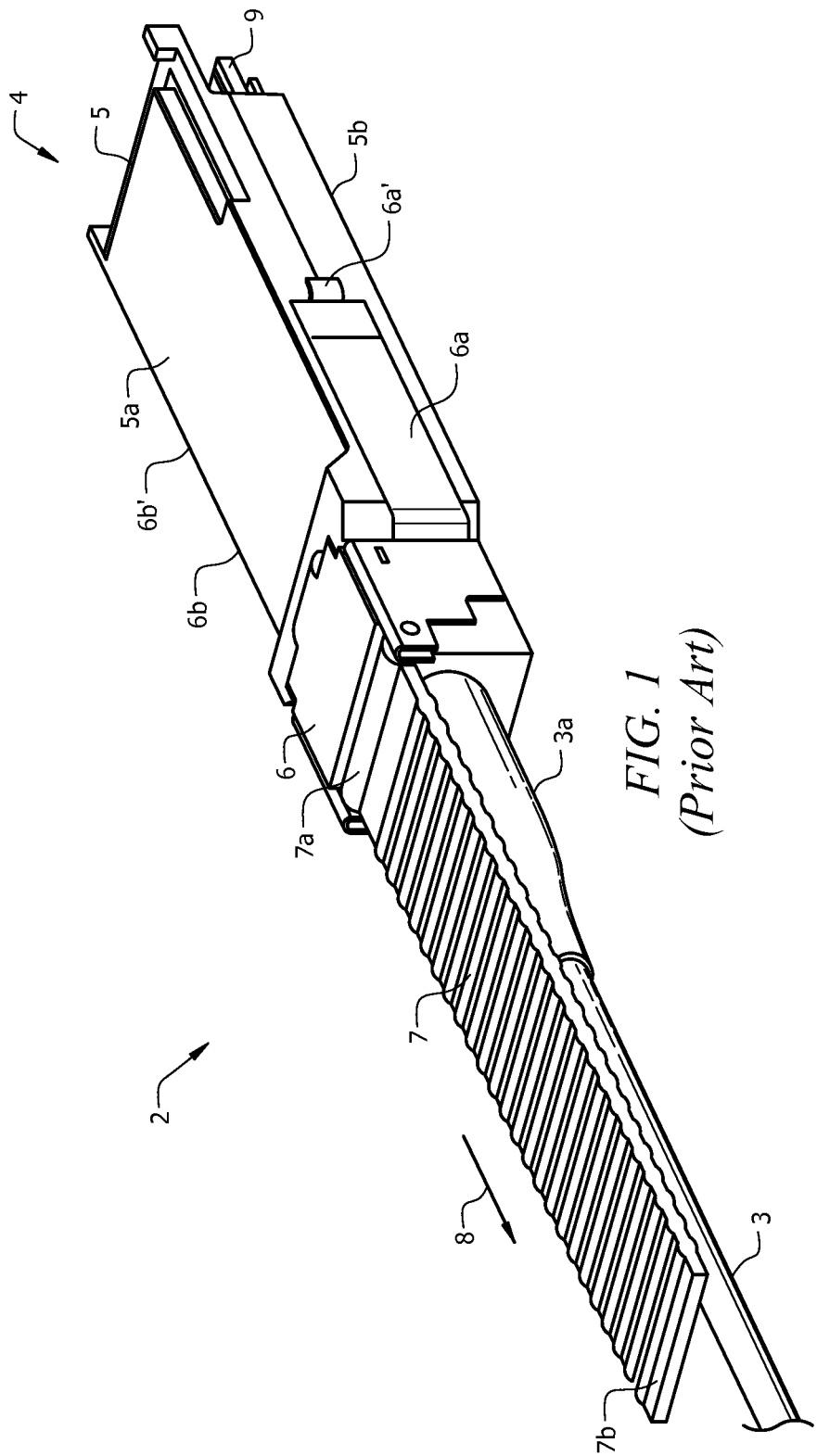
FIG. 1 illustrates a top perspective view of a known Quad Small Form-Factor Pluggable (QSFP) AOC currently used in the optical communications industry.

The invention is directed to an AOC having a molded plastic leadframe that obviates the need to use an optical connector in the AOC and that is capable of operating over a wide temperature range and a large number of temperature cycles. The AOC connector includes a plastic optical port that is adapted to be connected via an optically-transparent adhesive material to an end of an optical fiber cable. Illustrative, or exemplary, embodiments will now be described with reference to FIGS. 2-10C. Like reference numerals in FIGS. 2-10C represent like elements, components or features.

Figure 2:
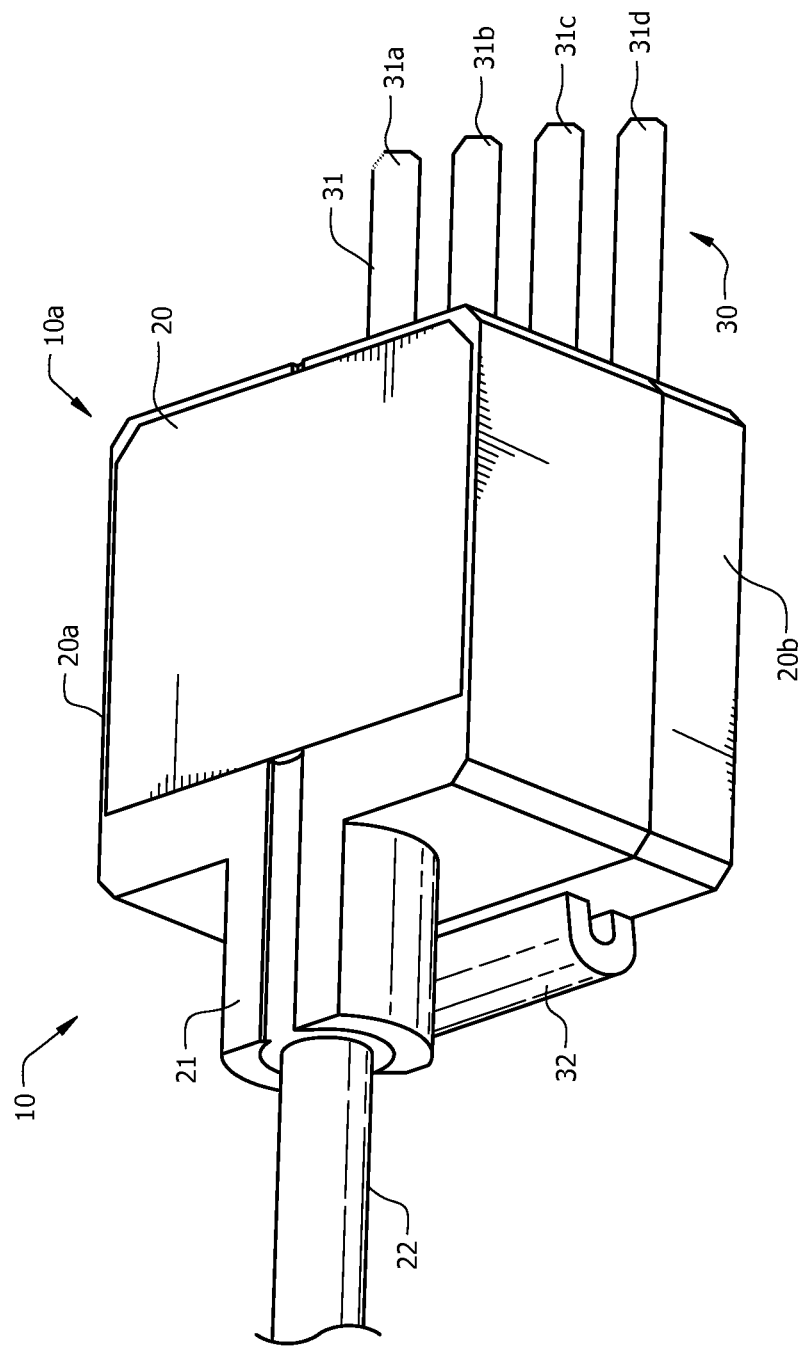
FIG. 2 illustrates a top perspective view of an AOC having a molded plug body in accordance with an illustrative embodiment.

FIG. 2 illustrates a top perspective view of an AOC 10 in accordance with an illustrative embodiment. An AOC connector 10a of the AOC 10 has a molded plug body 20. An optical fiber cable 22 has an end that is permanently secured to the AOC connector 10a. The molded plug body 20 has an upper molded portion 20a and a lower molded portion 20b that are mechanically coupled to one another. The upper and lower molded portions 20a and 20b of the molded plug body 20 are made of a plastic material, such as polyetherimide (PEI). One suitable PEI that may be used for this purpose is Ultem PEI. Ultem PEI is transparent to the wavelengths of light that are used by the AOC 10. Other moldable plastic materials are also suitable for use in making the molded plug body 20, as will be understood by persons of skill in the art in view of the description provided herein.

The upper molded portion 20a has an optical port 21 formed therein for receiving an end of an optical fiber cable 22 of the AOC 20. A leadframe 30 is secured to the lower molded portion 20b. The leadframe 30 includes leads 31a-31d for electrically coupling the AOC 10 to external electrical connections (not shown), a heat sink portion 32 for dissipating heat, and a mounting portion (not shown) for mounting electrical and optoelectronic components (not shown) within the molded plug body 20, as will be described below in more detail.

Figure 3:
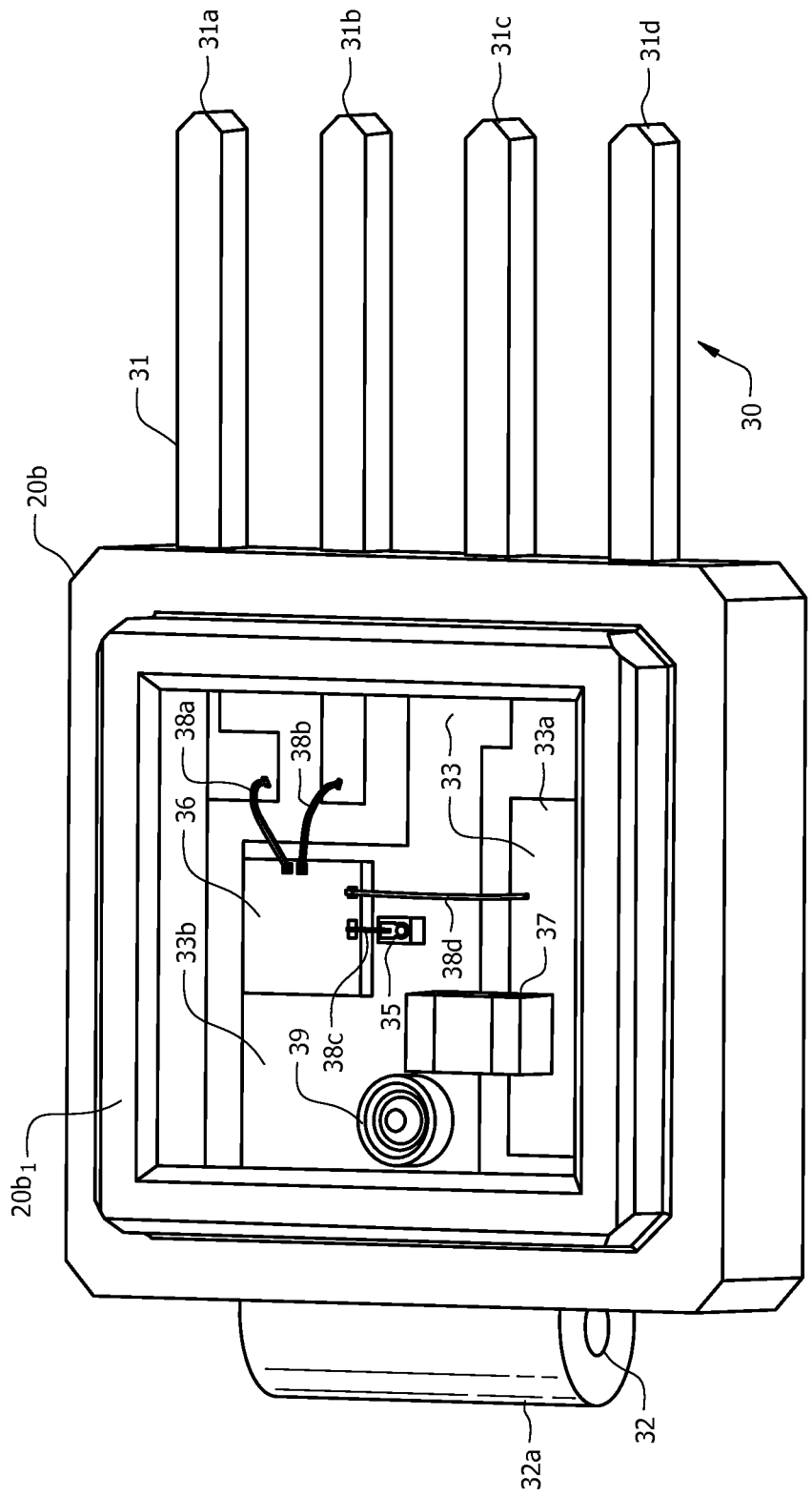
FIG. 3 illustrates a top perspective view of the molded plug body shown in FIG. 2 with the upper molded portion removed to allow the mounting portion of the leadframe to be seen.

FIG. 3 illustrates a top perspective view of the molded plug body 20 shown in FIG. 2 with the upper molded portion 20a removed to allow the mounting portion 33 of the leadframe 30 to be seen. The mounting portion 33 includes a first mounting portion 33a and a second mounting portion 33b. The leads 31a-31d correspond to the data+ lead, the data− lead, the ground lead, and the power supply lead, respectively. The first mounting portion 33a is part of lead 31d. The second mounting portion 33b is part of lead 31c and part of the heat sink portion 32. The heat sink portion 32 has a bend 32a formed in it where it transitions from the second mounting portion 33b into the heat sink portion 32, which is disposed against a bottom surface of the lower molded portion 20b, as will be described below in more detail.

In accordance with this illustrative embodiment, the AOC 10 includes an EO conversion element 35, but does not include an OE conversion element. Thus, the molded plug body 20 has optical transmit functionality, but does not have optical receive functionality. In accordance with this illustrative embodiment, the EO conversion element 35 is an LED, although other EO conversion elements (e.g., a laser diode) may instead be used for this purpose. The EO conversion element 35 is mounted on the second mounting portion 33b of the leadframe 30. A driver IC 36 is also mounted on the second mounting portion 33b of the leadframe 30. A power supply decoupler 37 is partially mounted on the first mounting portion 33a and partially mounted on the second mounting portion 33b. Bond wires 38a and 38b electrically connect respective pads of the driver IC 36 to the leads 31a and 31b, respectively. Bond wires 38c and 38d connect respective pads of the driver IC 36 to the anode (not shown) of the EO conversion element 35 and to the first mounting portion 33a. The cathode (not shown) of the EO conversion element 35 is connected to a ground node (not shown) by lead 31c. Electrical power is supplied to the driver IC 36 by lead 31d. The driver IC 36 modulates the EO conversion element 35 based on differential data signals received over leads 31a and 31b. The power supply decoupler 37 decouples the power supply lead 31d from the ground lead 31c.

A ridge $20b_1$ formed in the lower molded portion 20b surrounds the mounting portions 33a and 33b of the leadframe 30 and the components mounted thereon. The ridge $20b_1$ extends upwards in a direction away from and normal to the first and second mounting portions 33a and 33b. The purpose of the ridge $20b_1$ is described below in more detail with reference to FIG. 5. A fiducial feature 39 is used by a machine vision system (not shown) during the process of mounting the EO conversion element 35 on the second mounting portion 33b to position the EO conversion element 35 on the second mounting portion 33b.

Figure 4B:
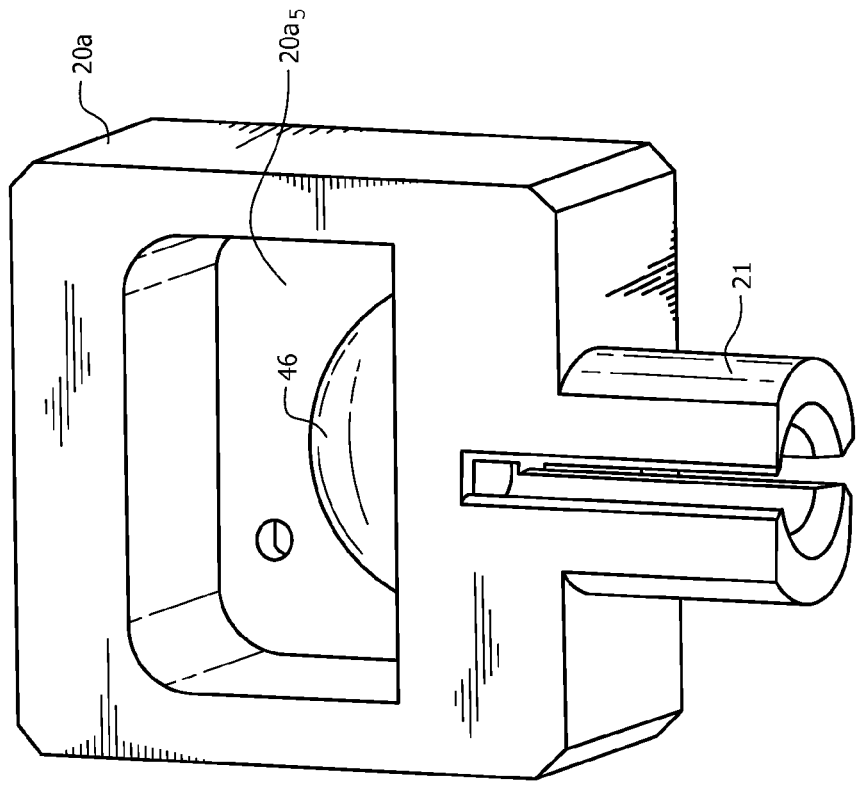
FIGS. 4A and 4B illustrate front and back perspective views, respectively, of the upper molded portion shown in FIG. 2.
Figure 4A:
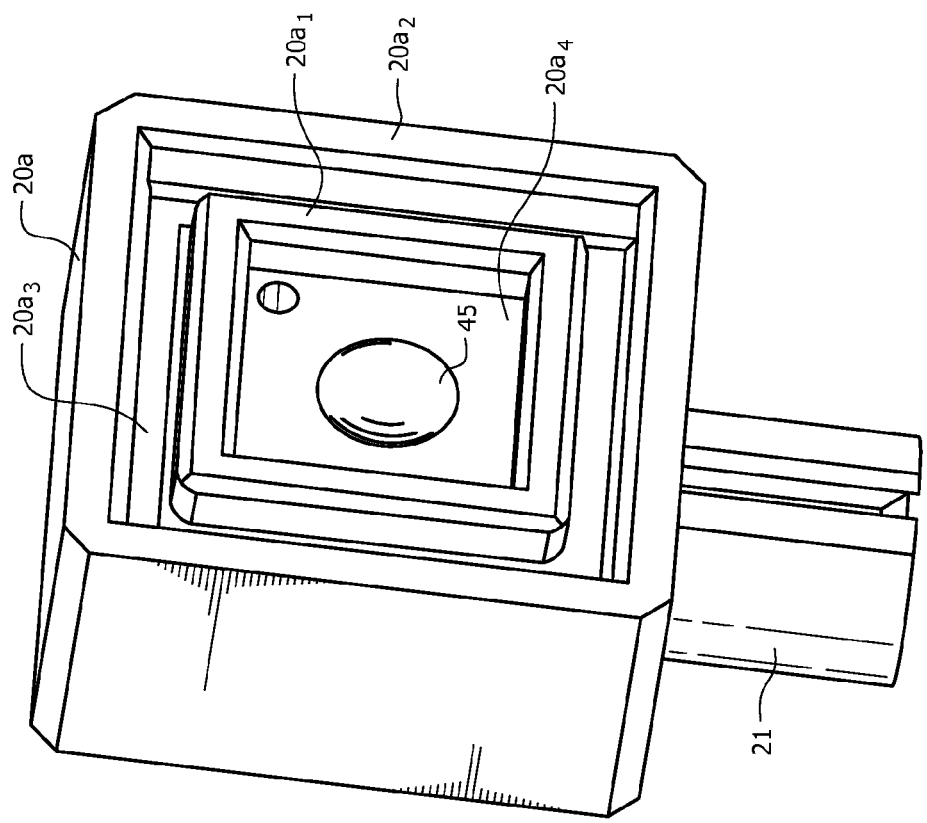
Figure 5:
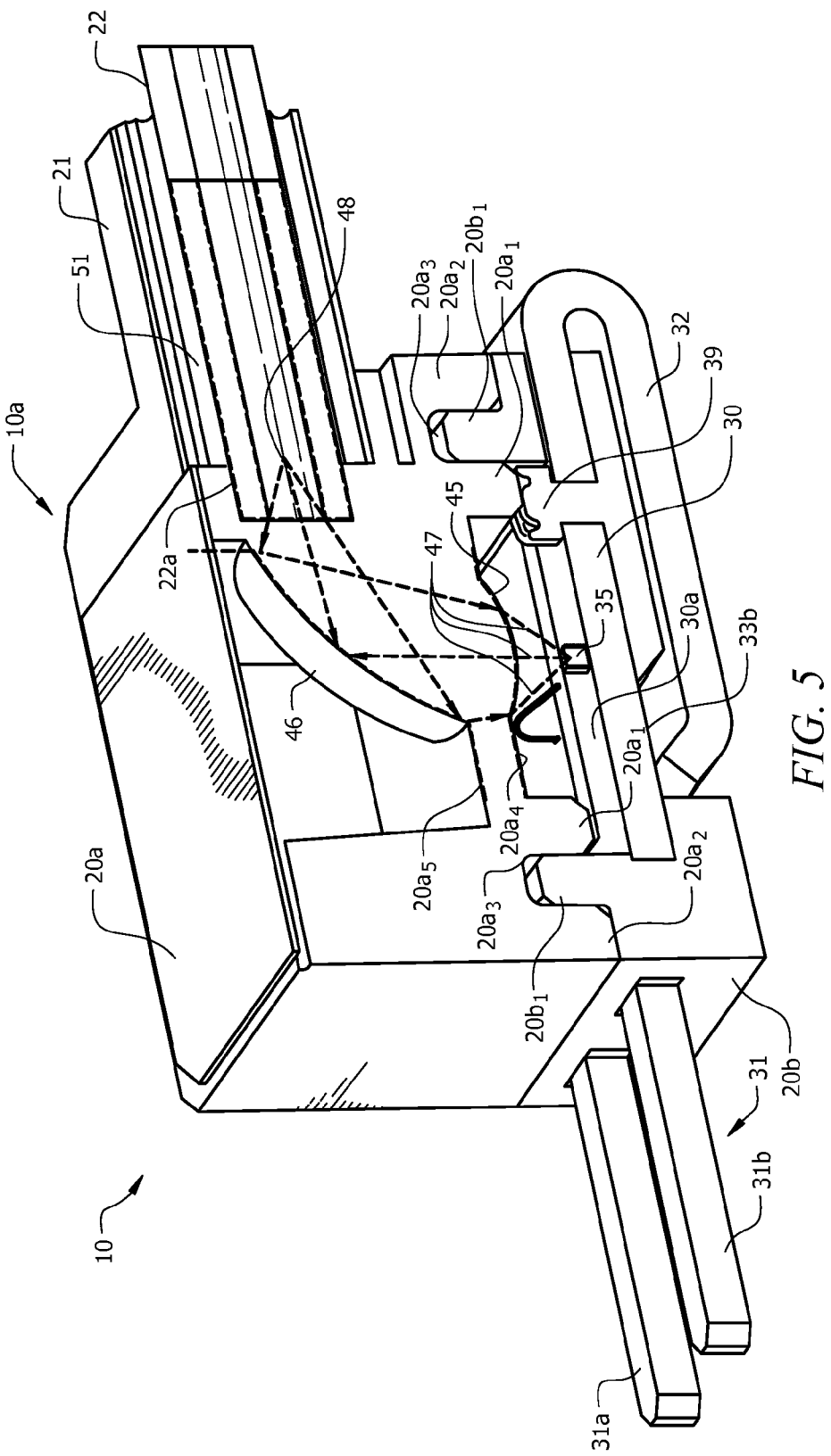
FIG. 5 illustrates a cross-sectional side view of the AOC shown in FIG. 2.

FIGS. 4A and 4B illustrate front and back perspective views, respectively, of the upper molded portion 20a shown in FIG. 2. FIG. 5 illustrates a cross-sectional side view of the AOC 10 shown in FIG. 2. The manner in which the upper and lower molded portions 20a and 20b engage one another will now be described with reference to FIGS. 4A-5. As can be seen in the front perspective view shown in FIG. 4A, the upper molded portion 20a has inner and outer walls $20a_1$ and $20a_2$ formed therein that are spaced apart to define a groove $20a_3$. The groove $20a_3$ is shaped and sized to receive the ridge $20b_1$ formed in the lower molded portion 20b shown in FIG. 3. As shown in FIG. 5, the ridge $20b_1$ fits snugly within the groove $20a_3$ to form a joint. After the upper and lower molded portions 20a and 20b are placed in engagement with one another in the manner shown in FIG. 5, a known ultrasonic welding process may be used to weld the corresponding surfaces together. Other techniques and materials may also be used for this purpose, such as, for example, adhesive bonding. The joint is very strong and is self-aligning. Consequently, once the joint has been formed through engagement of the ridge $20b_1$ with the groove $20a_3$, and the ridge $20b_1$ and groove $20a_3$ have been bonded together by ultrasonic welding or other bonding techniques, the molded plug body 20 will remain intact even under high mechanical stress.

As can be seen in FIG. 5, a cavity exists between the upper surface 30a of the leadframe 30 and the inner surface $20a_4$ of the upper molded portion 20a. Thus, the bond wires 38a-38d (FIG. 3) are disposed within the cavity and are surrounded by air. Therefore, the molded plug body 20 places no mechanical stress on the bond wires 38a-38d (FIG. 3) or on the components 35-37 (FIG. 3), which are also disposed within the cavity. As indicated above, encapsulations used in known AOCs place mechanical stresses on the bond wires that can cause them to break. In contrast, the configuration shown in FIG. 5 ensures that no mechanical stress is placed on the bond wires 38a-38d or on the components 35-37. In addition, because the molded plug body 20 does not physically come into contact with the bond wires 38a-38d or with the components 35-37, the operations of the AOC 10 are not limited by differences between the CTEs of the molded plug body 20 and the bond wires 38a-38d that can cause them to expand and contract at different temperatures. Consequently, the AOC 10 is capable of operating over a wider range of temperatures and over a larger number of temperature cycles than the aforementioned known AOCs that use epoxy encapsulations.

The inner surface $20a_4$ of the upper molded portion 20a has a refractive lens 45 formed therein. An outer surface $20a_5$ of the upper molded portion 20a has a reflective lens 46 formed therein. The lenses 45 and 46 are formed during the same molding process that is used to shape the upper and lower portions 20a and 20b of the molded plug body 20. The lens 46 is a total internal reflection (TIR) lens. Light 47 emitted by the EO conversion element 35 is refracted by the lens 45 such that it is at least partially collimated and directed onto the lens 46. The lens 46 focuses the light to a focal point 48 within the end 22a of the optical fiber 22. As will be described below in more detail with reference to FIGS. 6-8, the end 22a of the optical fiber 22 is secured within the optical port 21 with an adhesive material (e.g., epoxy) 51 that is transparent to the operational wavelength of the EO conversion element 35.

Figure 6:
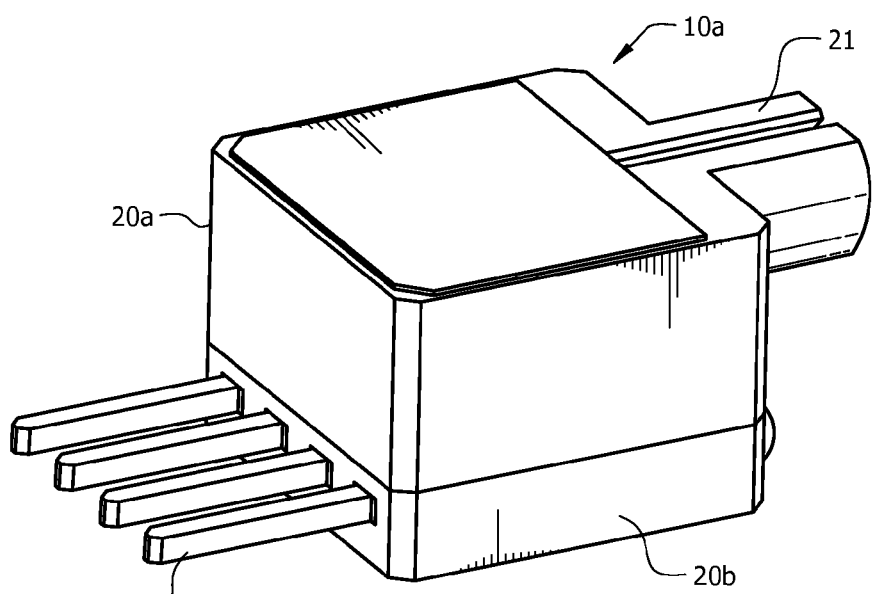
FIG. 6 illustrates a top perspective view of the AOC connector shown in FIG. 2.
Figure 7:
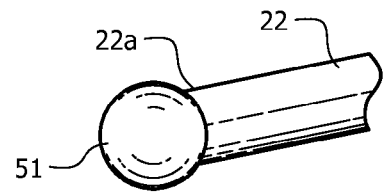
FIG. 7 illustrates a perspective end view of the optical fiber cable of the AOC shown in FIG. 2 having an adhesive material disposed thereon for securing the end of the cable to the AOC connector.
Figure 8:
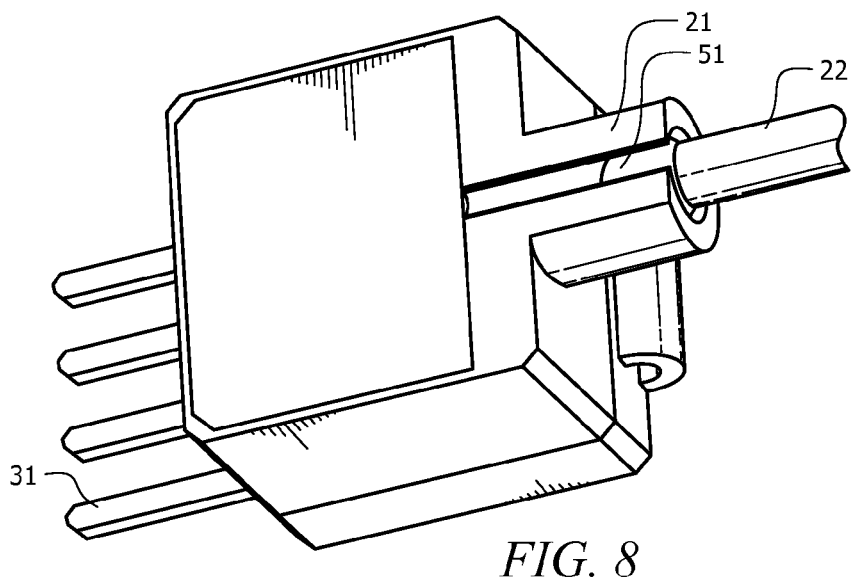
FIG. 8 illustrates a top perspective view of the AOC shown in FIG. 2 in arrangement with the optical fiber cable shown in FIG. 7.

FIG. 6 illustrates a top perspective view of the AOC connector 10a shown in FIG. 2. FIG. 7 illustrates a perspective end view of the optical fiber cable 22 having a ball of the optically-transparent adhesive material 51 (e.g., epoxy) disposed thereon. FIG. 8 illustrates a top perspective view of the AOC 10 shown in FIG. 2 after the end 22a (FIG. 5) of the optical fiber cable 22 having the adhesive material 51 thereon has been inserted into the plastic optical port 21. After the end 22a of the optical fiber cable 22 having the adhesive material 51 thereon has been inserted into the plastic optical port 21, the adhesive material 51 is cured. Curing of the adhesive material 51 causes it to harden and bond to the end 22a of the optical fiber cable 22 and to the interior surfaces of the optical port 21. In this way, the end 22a of the optical fiber cable 22 becomes permanently attached to the AOC connector 10a, as shown in FIG. 8. By attaching the end 22a to the optical port 21 in this manner, the need for an optical connector is obviated, which simplifies the design and reduces costs.

The optical fiber cable 22 may include a glass optical fiber or a plastic optical fiber (POF). Typically, the optical fiber is a POF having a 0.5 millimeter (mm) diameter. It should be noted, however, that the invention is not limited with respect to the type of optical fiber that is used in the AOC 10. In addition, although the optical fiber cable 22 has been described as containing a single optical fiber, the cable 22 may contain multiple optical fibers. For example, if an OE conversion element and associated electrical components are also included in the AOC connector 10a, the cable 22 will include a second optical fiber for inputting optical signals to the AOC connector 10a. The AOC connector 10a may be sold to customers without the cables 22, in which case the customers will secure the ends of the cables 22 to the respective AOC connectors 10a. In the case where a POF is used, the customer may simply cut the end of the POF with scissors, apply the adhesive material to the cut end of the POF, and secure the end of the POF to the optical port 21. This can be done easily and quickly.

The leadframe 30 described above with reference to FIGS. 2-8 is designed such that the leads 31 form a pluggable electrical connection that is adapted to be plugged into an external electrical connector (not shown). The external electrical connector into which the leads 31 are plugged will vary depending on the technical application in which the AOC 10 is employed. A few illustrative embodiments of technical applications in which the AOC 10 may be employed will now be described with reference to FIGS. 9-10C.

Figure 9:
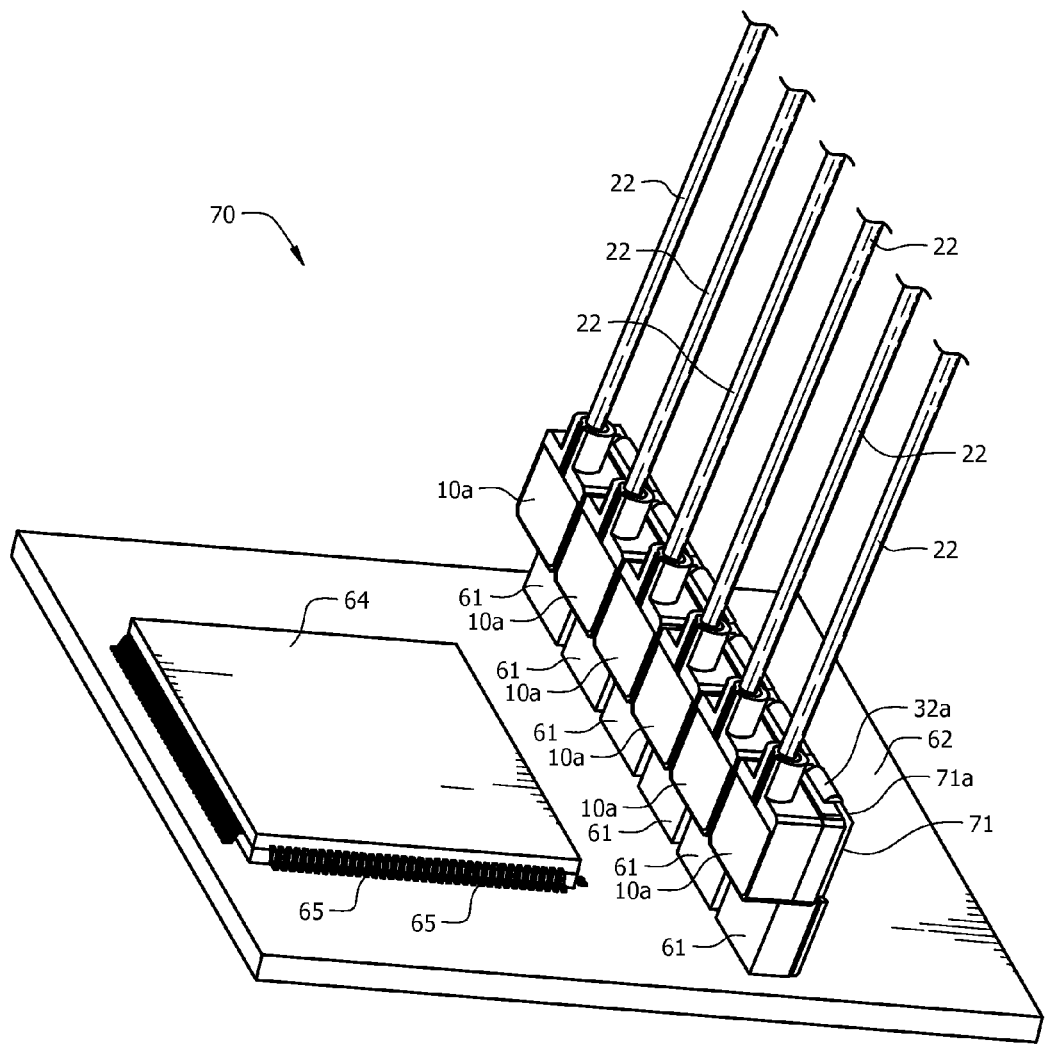
FIG. 9 illustrates a top perspective view of a power supply control system that employs multiple instances of the AOC shown in FIG. 2.

FIG. 9 illustrates a top perspective view of a power supply control system 70 in which multiple instances of the AOC 10 shown in FIG. 2 are employed. Each of the AOCs 10 plugs into a respective electrical connector 61. The electrical connectors 61 are mounted on a PCB 62. The PCB 62 has electrical conductors (not shown) passing through it. A controller IC 64 is also mounted on the PCB 62 and electrically connected by pins 65 to the PCB 62. The controller IC 64 may control a high-power, direct-conversion, switching power supply (not shown), in which case the AOCs 10 electrically isolate the controller IC 64 from such a power supply (not shown).

The electrical conductors (not shown) of the PCB 62 electrically connect input/output (I/O) pads (not shown) of the controller IC 64 to electrical contacts (not shown) of the electrical connectors 61. Through these connections, electrical signals are transmitted between the controller IC 64 and the leads 31$a$ and 31$b$ (FIG. 2) of the AOCs 10. The leads 31$c$ and 31$d$ (FIG. 2) of the AOCs 10 are connected to ground and power nodes (not shown), respectively. The bends 32$a$ formed in the heat sink portions 32 (FIGS. 2, 3 and 5) may be used to clip the AOC connectors 10$a$ to respective retaining members 71 that, in turn, are attached to the electrical connectors 61. For example, in the illustrative embodiment shown in FIG. 9, the bends 32$a$ are received in openings 71$a$ formed in the respective retaining members 71. In this way, the heat sink portions 32 perform the dual functions of dissipating heat and engaging external equipment.

Figure 10A:
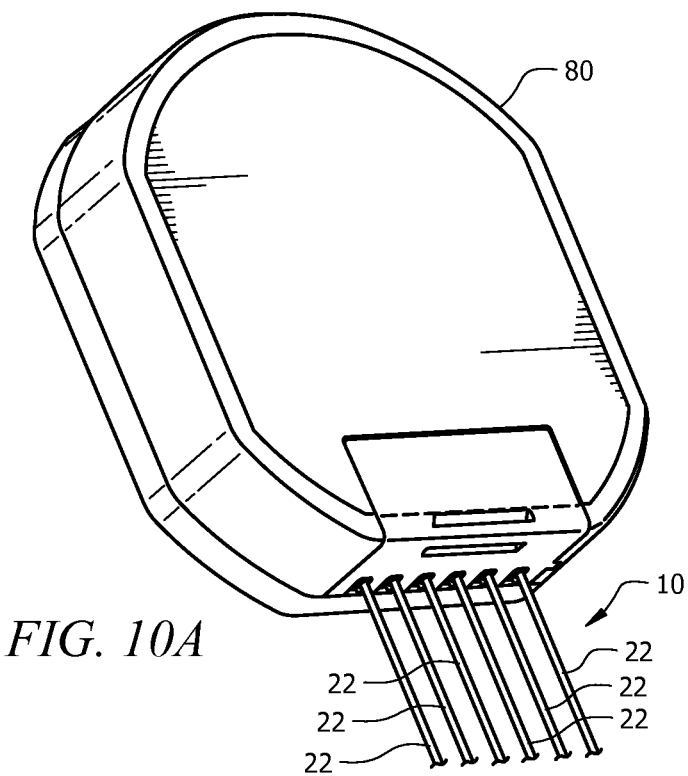
FIGS. 10A-10C illustrate top, bottom and backend perspective views, respectively, of a home network module that incorporates multiple instances of the AOC shown in FIG. 2.
Figure 10B:
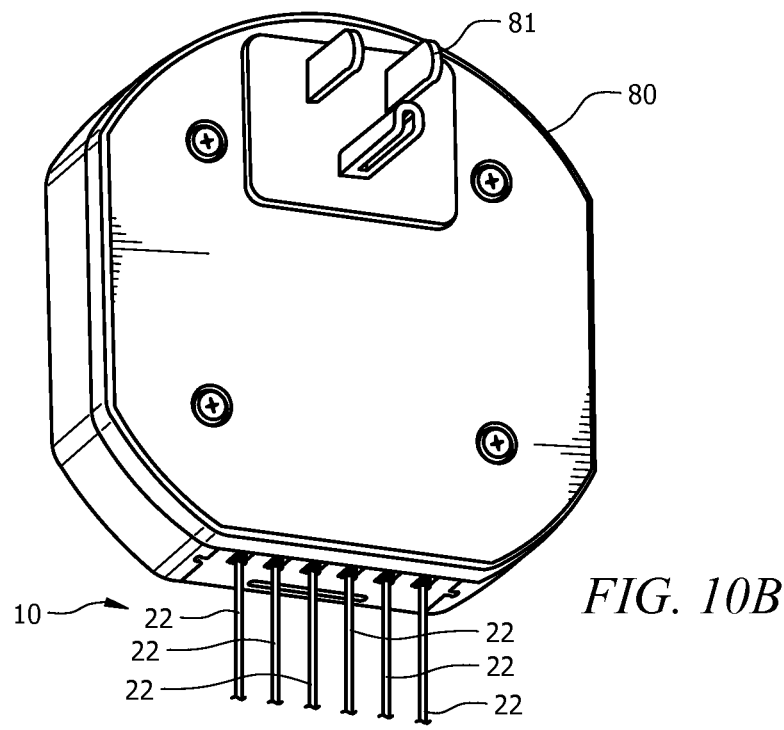
Figure 10C:
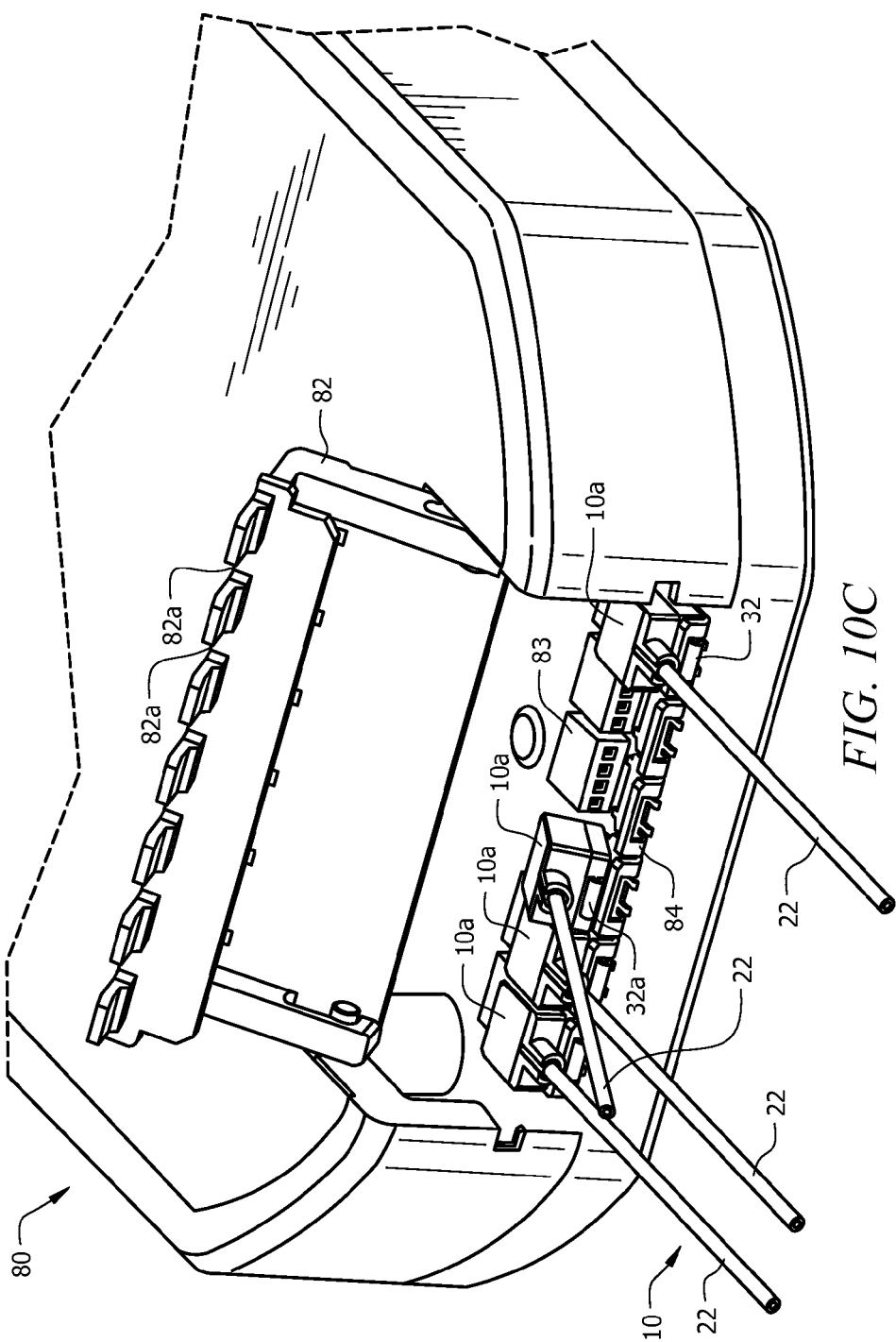

FIGS. 10A-10C illustrate top, bottom and backend perspective views, respectively, of a home network module 80 that incorporates multiple instances of the AOC 10 shown in FIG. 2 employed in a home premises application. In accordance with this illustrative embodiment, the module 80 is connected to six of the AOCs 10. The opposite ends of the optical fiber cables 22 may be connected to devices that are sometimes used in homes, such as, for example, modems, computers, phones, televisions, and home entertainment systems. The module 80 has an electrical plug 81 for electrically interconnecting the module with an electrical wall outlet (not shown). As shown in FIG. 10$c$, a door 82 that is hinged to the backend of the module 80 can be opened and closed. The door 82 has slots 82$a$ formed therein through which the optical fiber cables 22 pass when the door 82 is in the closed position shown in FIGS. 10$a$ and 10$b$. The module 80 contains electrical connectors 83 for receiving the leads 31 (FIG. 2). The module 80 has retaining members 84 for engaging the bends 32$a$ formed in the heat sink portions 32.

While FIGS. 9-10C show a few illustrative applications for the AOC 10, the invention is not limited to any particular application for the AOC 10. The AOC 10 may be used in any application in which it is deemed suitable for use, as will be understood by persons skilled in the art in view of the description being provided herein.

It should be noted that the invention has been described with reference to illustrative embodiments and that the invention is not limited to these embodiments. Those skilled in the art will understand the manner in which modifications can be made to the illustrative embodiments and that all such modifications are within the scope of the invention. For example, although the molded plug body 20 and the leadframe 30 have been described as having particular configurations, persons skilled in the art will understand the manner in which these configurations may be modified while still achieving the goals of the invention. These and other modifications may be made to the embodiments described herein and all such modified embodiments are also within the scope of the invention, as will be understood by persons skilled in the art.

What is claimed is:

1. An active optical cable (AOC) connector for use with an AOC, the AOC connector comprising:
    a molded plug body having a first molded plug portion and a second molded plug portion that are coupled together, and wherein a cavity exists between adjacent inner surfaces of the first and second molded plug portions when the first and second molded plug portions are coupled together, the molded plug portions comprising a plastic material, the molded plug body having at least one optical port and an optics system integrally formed therein, the optical port configured to receive a non-connectorized end of an optical fiber cable inserted into the optical port;
    a leadframe coupled to the molded plug body, the leadframe comprising:
        a first mounting portion and a second mounting portion that are disposed within the cavity that exists between the first and second molded plug portions,
        a heat sink portion that begins on a first end thereof at the second mounting portion and extends underneath the second molded plug portion such that a second end of the heat sink portion is in contact with an outer surface of the second molded plug portion,
        a plurality of leads with distal ends that extend away from the molded plug body, wherein a first end of a first lead of the plurality of leads begins at the first mounting portion and a first end of a second lead of the plurality of leads begins at the second mounting portion;
    at least one optoelectronic element mounted on the second mounting portion, the optoelectronic element being electrically connected to at least the second lead of said plurality of leads;
    at least one electrical component mounted on the second mounting portion of the leadframe; and
    one or more bond wires that extend between the optoelectronic element and the electrical component, and wherein the bond wires are at least partially disposed within the cavity that exists between the first and second molded plug portions.

2. The AOC connector of claim 1, wherein said at least one electrical component includes at least one integrated circuit (IC).

3. The AOC connector of claim 2, wherein the optoelectronic element is an electrical-to-optical (EO) conversion element, and wherein said at least one IC is a driver IC for driving the EO conversion element, the driver IC being electrically coupled to at least second and third leads of said plurality of leads.

4. The AOC connector of claim 3, wherein the optics system is formed in the first molded plug portion, the optics system coupling light produced by the EO conversion element into the optical port.

5. The AOC connector of claim 4, wherein the optics system includes at least a refractive lens and a reflective lens, the refractive lens receiving light produced by the EO conversion element and directing the light onto the reflective lens, and wherein the reflective lens focuses the light to a focal point within the optical port.

6. The AOC connector of claim 2, wherein the optoelectronic element is an optical-to-electrical (OE) conversion element, and wherein said at least one IC is a receiver IC for receiving electrical signals produced by the OE conversion element, the receiver IC being electrically coupled to at least second and third leads of said plurality of leads.

7. The AOC connector of claim 6, wherein the optics system is formed in the first molded plug portion, the optics system coupling light passing out of the optical port onto the OE conversion element.

8. The AOC connector of claim 7, wherein the optics system includes at least a refractive lens and a reflective lens, the reflective lens receiving light passing out of the optical port and directing the light onto the refractive lens, and wherein the refractive lens directs the light onto to OE conversion element.

9. The AOC connector of claim 1, wherein one of the first and second molded plug portions has a ridge formed therein on the inner surface thereof and wherein one of the first and second molded plug portions has a groove formed therein on the inner surface thereof, and wherein when the first and second molded plug portions are coupled together, the ridge is mated with the groove to form a joint.

10. The AOC connector of claim 9, wherein the ridge and groove are welded together.

11. The AOC connector of claim 9, wherein the ridge and groove are bonded together with an adhesive material.

12. An active optical cable (AOC) comprising:
a molded plug body having a first molded plug portion and a second molded plug portion that are coupled together, and wherein a cavity exists between adjacent inner surfaces of the first and second molded plug portions when the first and second molded plug portions are coupled together, the molded plug portions comprising a plastic material, the molded plug body having at least one optical port and an optics system integrally formed therein, the optical port configured to receive a non-connectorized first end of an optical fiber cable inserted into the optical port;
an optical fiber cable having a non-connectorized first end and a second end, the non-connectorized first end secured to the optical port by an adhesive material that is transparent to an operating wavelength of the AOC such that light passing into or out of the non-connectorized first end of the optical fiber cable passes through the adhesive material;
a leadframe coupled to the molded plug body, the leadframe comprising:
a first mounting portion and a second mounting portion that are disposed within the cavity that exists between the first and second molded plug portions,
a heat sink portion that begins on a first end thereof at the second mounting portion and extends underneath the second molded plug portion such that a second end of the heat sink portion is in contact with an outer surface of the second molded plug portion,
a plurality of leads with distal ends that extend away from the molded plug body, wherein a first end of a first lead of the plurality of leads begins at the first mounting portion and a first end of a second lead of the plurality of leads begins at the second mounting portion;
at least one optoelectronic element mounted on the second mounting portion, the optoelectronic element being electrically connected to at least the second lead of said plurality of leads;
at least one electrical component mounted on the second mounting portion of the leadframe; and
one or more bond wires that extend between the optoelectronic element and the electrical component, and wherein the bond wires are at least partially disposed within the cavity that exists between the first and second molded plug portions.

13. The AOC of claim 12, wherein said at least one electrical component includes at least one integrated circuit (IC).

14. The AOC of claim 13, wherein the optoelectronic element is an electrical-to-optical (EO) conversion element, and wherein said at least one IC is a driver IC for driving the EO conversion element, the driver IC being electrically coupled to at least second and third leads of said plurality of leads.

15. The AOC of claim 14, wherein the optics system is formed in the first molded plug portion, the optics system coupling light produced by the EO conversion element into the optical port.

16. The AOC of claim 15, wherein the optics system includes at least a refractive lens and a reflective lens, the refractive lens receiving light produced by the EO conversion element and directing the light onto the reflective lens, and wherein the reflective lens focuses the light to a focal point within the optical port.

17. The AOC of claim 13, wherein the optoelectronic element is an optical-to-electrical (OE) conversion element, and wherein said at least one IC is a receiver IC for receiving electrical signals produced by the OE conversion element, the receiver IC being electrically coupled to at least second and third leads of said plurality of leads.

18. The AOC of claim 17, wherein the optics system is formed in the first molded plug portion, the optics system coupling light passing out of the optical port onto the OE conversion element.

19. The AOC connector of claim 18, wherein the optics system includes at least a refractive lens and a reflective lens, the reflective lens receiving light passing out of the optical port and directing the light onto the refractive lens, and wherein the refractive lens directs the light onto to OE conversion element.

20. The AOC of claim 12, wherein one of the first and second molded plug portions has a ridge formed therein on the inner surface thereof and wherein one of the first and second molded plug portions has a groove formed therein on the inner surface thereof, and wherein when the first and second molded plug portions are coupled together, the ridge is mated with the groove to form a joint.

21. The AOC of claim 20, wherein the ridge and groove are welded together.

22. The AOC of claim 20, wherein the ridge and groove are bonded together with an adhesive material.

* * * * *